US009182899B2

(12) United States Patent
Knowles

(10) Patent No.: US 9,182,899 B2
(45) Date of Patent: Nov. 10, 2015

(54) PAGING WITHIN A SCROLLABLE LIST

(75) Inventor: Ian Knowles, Burnham (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 13/463,112

(22) Filed: May 3, 2012

(65) Prior Publication Data

US 2013/0120285 A1    May 16, 2013

Related U.S. Application Data

(63) Continuation of application No. PCT/GB2010/002045, filed on Nov. 8, 2010.

(30) Foreign Application Priority Data

Nov. 6, 2009 (GB) .................................. 0919516.5

(51) Int. Cl.
*G06F 3/0485* (2013.01)
*G06F 3/0488* (2013.01)

(52) U.S. Cl.
CPC ............ *G06F 3/0488* (2013.01); *G06F 3/0485* (2013.01); *G06F 3/04883* (2013.01)

(58) Field of Classification Search
USPC .......... 345/156, 163, 173, 684; 715/738, 784, 715/787
See application file for complete search history.

(56) References Cited

U.S. PATENT DOCUMENTS

| | | | |
|---|---|---|---|
| 2005/0012723 A1* | 1/2005 | Pallakoff | 345/173 |
| 2006/0026521 A1 | 2/2006 | Hotelling | |
| 2007/0024595 A1* | 2/2007 | Baker et al. | 345/173 |
| 2007/0150830 A1 | 6/2007 | Ording | |
| 2007/0226646 A1 | 9/2007 | Nagiyama | |
| 2008/0036743 A1* | 2/2008 | Westerman et al. | 345/173 |
| 2008/0052945 A1 | 3/2008 | Matas | |
| 2009/0064055 A1 | 3/2009 | Chaudhri | |
| 2009/0158203 A1 | 6/2009 | Kerr | |
| 2009/0239587 A1 | 9/2009 | Negron | |

FOREIGN PATENT DOCUMENTS

| | | |
|---|---|---|
| WO | 2010/094105 | 8/2010 |
| WO | 2010094105 A | 8/2010 |

OTHER PUBLICATIONS

GB1018871.2 Combined Search and Examination Report.
PCT/GB2010/002045 International Search Report and written opinion.
GB1018871.2 Examination Report.

* cited by examiner

*Primary Examiner* — Dwayne Bost
*Assistant Examiner* — Sepehr Azari
(74) *Attorney, Agent, or Firm* — Vorys, Sater, Seymour and Pease LLP; Vincent M DeLuca

(57) ABSTRACT

A method and apparatus are provided for displaying data on a touch sensitive display (2) a detector (4) and CPU (6) detect contact with the touch sensitive display (2) and control the display of data. The system is responsive to a predetermined swiping duration of a finger on the display or to a manual selectable switch to change the display of data between a scrolling of data and a paging of data.

8 Claims, 2 Drawing Sheets

PAGING WITHIN A SCROLLABLE LIST

CROSS REFERENCE TO RELATED APPLICATIONS

This application is a continuation of PCT/GB2010/002045, filed on Aug. 11, 2010, entitled "Touch Sensitive Display" and claims priority to GB 0919516.5, filed on Nov. 6, 2009, and entitled "Touch Sensitive Display", both of which are incorporated by reference entirely herein for all purposes.

This invention relates to a method and apparatus for displaying data on a touch sensitive display.

Touch sensitive displays are used in many devices including mobile telephones, PDA's, and also radio receivers such as internet radios which are able to play a plurality of radio channels provided over the internet and streamed over a WiFi link to the internet radio.

In many devices which use touch sensitive displays it is possible to scroll through a list of items on the display by swiping a finger on the touch sensitive display in the direction in which it is desired to scroll.

It is a feature of such scrolling systems that in many applications, scrolling stops when the finger is removed from the touch sensitive display. In some systems, the list scrolls at a speed dependent on the speed at which the finger is swiped on the touch sensitive display and continues to scroll whilst decelerating from that speed to a stopping point somewhere further down the list. Systems of this type are described in US2007/0150830 A1.

SUMMARY

None of the systems currently available allow users to page through a scrollable list using this type of touch sensitive display system and we have appreciated that this would be a desirable feature to implement.

In accordance with an embodiment of the invention there is provided a touch sensitive display for displaying a list which is scrollable in response to swiping of a finger on the touch sensitive display, wherein the system is controllable to scroll through the list in response to a swipe or to page through the list in response to a swipe.

BRIEF DESCRIPTION OF THE DRAWINGS

A preferred embodiment of the invention will now be described in detail by way of example with reference to the drawings in which.

DETAILED DESCRIPTION

Figure 1:
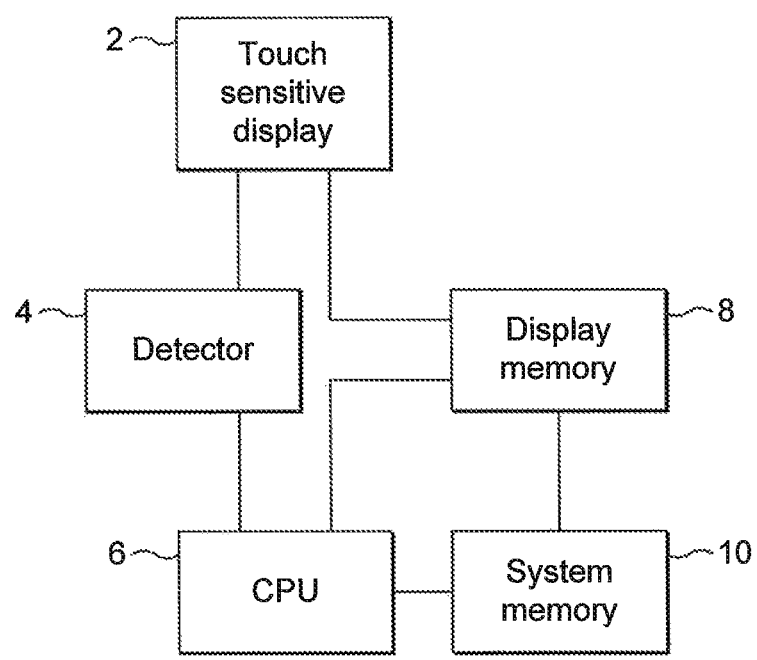
FIG. 1 shows a block diagram of a touch sensitive display system.

The diagram of FIG. 1 shows a touch sensitive display 2 which is coupled to a detector 4. The detector 4 is responsive to signals provided by the touch sensitive display in response to touching of the display. These signals indicate the area of display which is being touched and the detector provides data representative of this to a CPU 6. When the touch sensitive display 2 is swiped by sliding a finger across the display then the signals provided to the detector 4 changes and thus the data provided to CPU 6 changes. The rate of change of the data is proportional to the speed of swiping of the finger on the display and the change in the data indicates direction and this can be detected by the CPU 6.

A display memory 8 stores data for display on the touch sensitive display 2 and this data is provided under the control of the CPU 6 from system memory 10. This data may comprise a list of items which may be a list of selectable items, or it may be an electronic document such as a text or image document with or without predefined page breaks.

In this embodiment, the CPU is arranged to be responsive to a swipe to page through a list being displayed on the touch sensitive display 2 from the system memory 10 via display memory 8. When the CPU detects that a swipe has taken place in, for example, the vertical direction with an upwards movement then it controls the system memory 10 and display memory 8 to continue scrolling through the list after the swipe until the item visible at the bottom of the display before the swipe is the top item in the display after the swipe i.e. until a page equivalent to the length of the display area less one line has been displayed. Alternatively the paging can be controlled using the whole length of the display and therefore will not display the item previously at the bottom of the display. Repeated swipes will therefore cause the system to page through the list in a similar manner.

When a text document is being displayed, the system can be similarly controlled to display a line of the text previously at the bottom of the display before a swipe at the top of the display after the swipe. Alternatively a full page can be scrolled through and all of the data subsequently displayed will be from the next page in the text document. If the text document contains page breaks, then swiping can be controlled to move the image displayed to the portion following the next page break.

In the case of an image a similar control system may be applied. The system can be controlled to move to the portion of the image next adjacent to the previously displayed portion without any overlap being displayed, or alternatively can be controlled to display a small overlap. If page breaks are provided in the image document then the system can be controlled to move to display the portion of the image following the next page break.

The system can also be configured to scroll through the list in a manner such as to continue to scroll after removal of the finger beyond the last item displayed before scrolling began. This can be achieved by having the CPU configured to be responsive to different types of swipe, for example, a continuous scrolling could be implemented in response to a long swipe of the finger across most of the display area and paging could be implemented in response to a short hard swipe over only part of the display. Alternatively, a manual switch could be provided to enable the system to switch between two types of scrolling.

Figure 2:
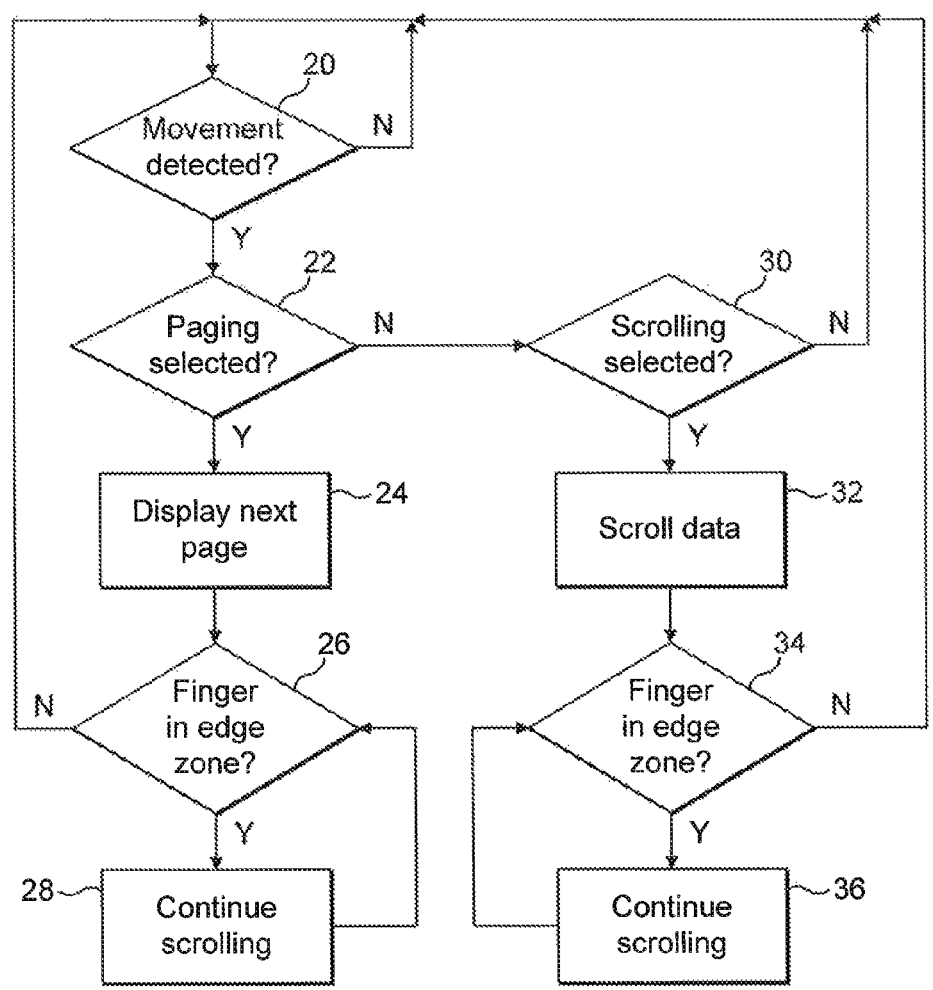
FIG. 2 shows a flow diagram of the steps performed in an embodiment of the invention.

A flow diagram showing the steps required to implement the embodiment of the invention is illustrated in FIG. 2. In this, a swipe on the screen is detected at the decision box 20 (movement detected). If there is movement detected then the system determines at 22 whether paging has been selected. Paging may be selected in response to the speed and length of the swipe or by a manual switch provided on the display unit. If paging has been selected then at 24 the system displays the next page. At 26 a determination is made as to whether or not the finger which performed the swiping has been moved to an edge zone. If it has, and this is the edge zone required to maintain paging in the direction of the swipe then at 28 a next page is displayed and a determination made again at 26 as to whether or not the finger is in the edge zone. When the finger is removed from the edge zone the system returns to the decision box 20 to determine whether or not movement is detected. It will continue to loop around through this decision box until movement is next detected.

If a determination is made in response to the speed and length of the swipe or from a manual switch on the unit that paging has not been selected the system passes to decision box 30 to determine whether scrolling has been selected. If it has not then the system returns to the movement detection decision at 20. If scrolling has been detected then the system starts to scroll data at 32 at a rate dependent on the direction and speed of the swipe of a finger on the touch sensitive display. At 34 a determination is made as to whether the swiping finger has been moved to an edge zone. If it has then at 36 the system continues scrolling before looping round to the decision unit 34. When the finger is removed from the edge zone then the determination at 34 will be no and the system will again start to look for detected movement at 20.

Using such an arrangement enables a user to page through a list being displayed without losing his place in the list or missing items which he may wish to review.

I claim:

1. A touch sensitive display system including a processor, the system being configured to display data which is scrollable in response to swiping of a finger on a touch sensitive display having a display area length, the system being responsive to a swipe of a predetermined length over the touch sensitive display to scroll a display of said data on said touch sensitive display such that said data traverses through said display area length from one end thereof to the other end thereof, wherein said predetermined length is shorter than said display area length, and said system being responsive to a swipe over the touch sensitive display of a second length longer than said predetermined length, to scroll the display of said data through said display area length by an amount proportional to said second length.

2. A touch sensitive display system according to claim 1, wherein the system is further responsive to contact of a finger in an edge zone of the display to scrolling the display of data after a swipe.

3. A touch sensitive display according to claim 1, wherein the system scrolls the display of said data in response to said swipe of predetermined length such that there is no overlap in displayed data subsequent to said scrolling.

4. A touch sensitive display according to claim 1, wherein the system scrolls the display of said data in response to said swipe of predetermined length such that there is an overlap in displayed data subsequent to said scrolling.

5. A computerized method of displaying data, comprising:

displaying data on a touch sensitive display having a display area length, said data being scrollable in response to swiping of a finger on the touch sensitive display;

responsive to a swipe of a predetermined length over the touch sensitive display, scrolling through the data such that said data traverses through said display area length from one end thereof to the other end thereof, wherein said predetermined length is shorter than said display area length, and responsive to a swipe of a second length longer than said predetermined length, scrolling the data through said display area length by an amount proportional to said second length.

6. A computerized method of displaying data according to claim 5, further comprising continuing scrolling the display of data in response to a signal indicating contact of the finger in an edge zone of the display, after a swipe.

7. A computerized method of displaying data according to claim 5, wherein the scrolling of said data in response to said swipe of predetermined length is such that there is no overlap in displayed data subsequent to said scrolling.

8. A computerized method of displaying data according to claim 5, wherein the scrolling of said data in response to said swipe of predetermined length is such that there is overlap in displayed data subsequent to said scrolling.

* * * * *